United States Patent
Cho et al.

(10) Patent No.: US 10,170,941 B2
(45) Date of Patent: Jan. 1, 2019

(54) NON-CONTACT TYPE POWER TRANSFER APPARATUS

(71) Applicant: SAMSUNG ELECTRO-MECHANICS CO., LTD., Suwon-si (KR)

(72) Inventors: Sang Ho Cho, Suwon-si (KR); Tae Seok Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 237 days.

(21) Appl. No.: 15/205,705

(22) Filed: Jul. 8, 2016

(65) Prior Publication Data

US 2017/0187240 A1 Jun. 29, 2017

(30) Foreign Application Priority Data

Dec. 23, 2015 (KR) .................. 10-2015-0184636

(51) Int. Cl.
*H01F 27/42* (2006.01)
*H02J 50/12* (2016.01)
*H02J 7/02* (2016.01)
*H02M 7/5387* (2007.01)

(52) U.S. Cl.
CPC .............. *H02J 50/12* (2016.02); *H02J 7/025* (2013.01); *H02M 7/53871* (2013.01)

(58) Field of Classification Search
CPC ....... H02J 50/12; H02J 7/025; H02M 7/53871
See application file for complete search history.

(56) References Cited

U.S. PATENT DOCUMENTS

| 9,735,584 B2 * | 8/2017 | Taylor ..................... H02J 5/005 |
| 2012/0042588 A1 * | 2/2012 | Erickson, Jr. ..... H01L 31/02021 52/173.3 |
| 2012/0215216 A1 * | 8/2012 | Friedrichs .......... A61B 18/1206 606/38 |
| 2015/0207333 A1 * | 7/2015 | Baarman ................. H02J 5/005 307/104 |
| 2017/0062876 A1 * | 3/2017 | Narla .................. H01M 10/425 |

FOREIGN PATENT DOCUMENTS

| JP | 9-191580 A | 7/1997 |
| JP | 2012-165510 A | 8/2012 |
| KR | 10-2014-0024194 A | 2/2014 |
| KR | 10-2015-0054802 A | 5/2015 |
| WO | WO 2014/042681 A2 | 3/2014 |

OTHER PUBLICATIONS

Korean Office Action dated Jan. 16, 2017 in corresponding Korean Patent application No. 10-2015-0184636 (8 pages in English, 6 pages in Korean).

* cited by examiner

*Primary Examiner* — Jared Fureman
*Assistant Examiner* — Duc M Pham
(74) *Attorney, Agent, or Firm* — NSIP Law

(57) ABSTRACT

A non-contact type power transfer apparatus includes a power converter configured to convert input power into transmission power; a power transmitter configured to transmit the transmission power in a non-contact manner; and a controller configured to provide a power conversion control signal to control a power conversion operation of the power converter according to a state of the transmission power, and to output an input power control signal to control a power level of the input power according to the power conversion control signal.

19 Claims, 17 Drawing Sheets

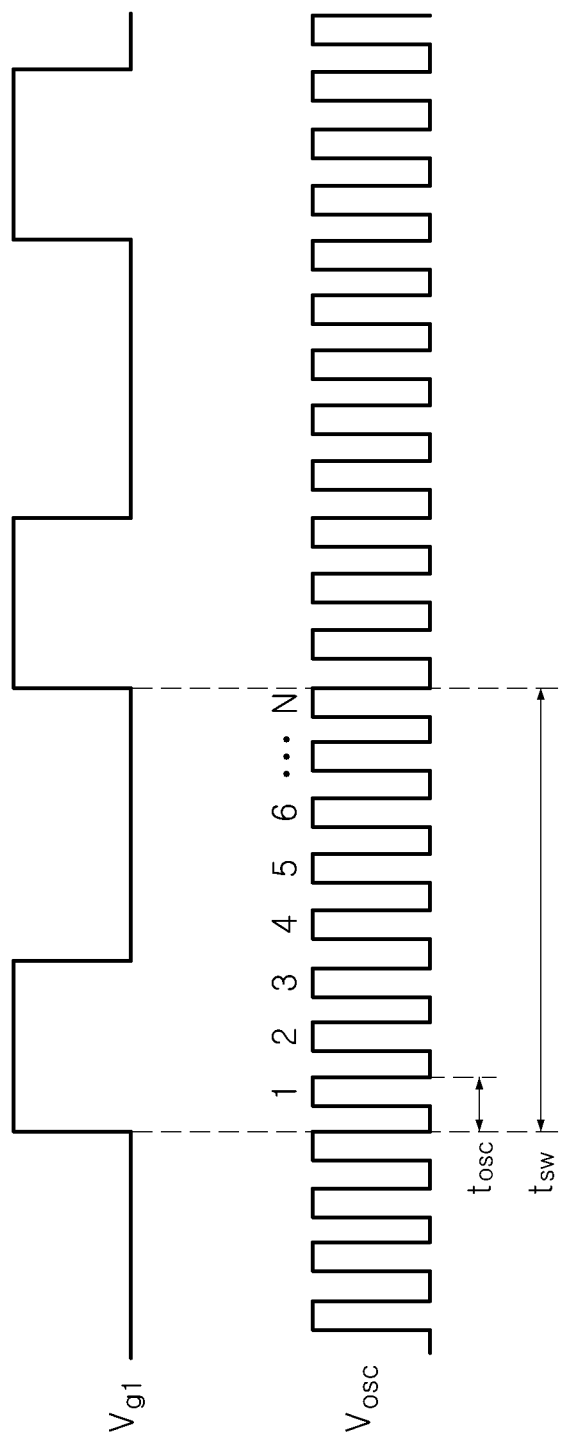

NON-CONTACT TYPE POWER TRANSFER APPARATUS

CROSS-REFERENCE TO RELATED APPLICATION

This application claims the benefit of Korean Patent Application No. 10-2015-0184636, filed on Dec. 23, 2015 in the Korean Intellectual Property Office, the entire disclosure of which is incorporated herein by reference for all purposes.

BACKGROUND

1. Field

The following description relates to a non-contact type power transfer apparatus that transmits power in a non-contact type manner.

2. Description of Related Art

Recently, as technology for wireless charging has been implemented within smartphones, a market of wireless charging has emerged. However, since wireless charging has lower charging power as compared to an existing wired charging in which rapid charging is generally available, there are problems that are disadvantageous in terms of a charging time, amongst other issues. Accordingly, a demand for increased output power of the wireless charging has grown.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect a non-contact type power transfer apparatus includes a power converter configured to convert input power into transmission power; a power transmitter configured to transmit the transmission power in a non-contact manner; and a controller configured to provide a power conversion control signal to control a power conversion operation of the power converter according to a state of the transmission power, and to output an input power control signal to control a power level of the input power according to the power conversion control signal.

The non-contact type power transfer apparatus may further include a power supply configured to adjust the power level of the input power according to the input power control signal output from the controller and to supply the input power to the power converter.

The controller may be further configured to output the power conversion control signal to adjust at least one of a switching frequency of the power converter, a switching on/off duty ratio of the power converter, or combinations thereof; and, to output the input power control signal to adjust a switching on/off duty ratio of the power supply according to at least one of the switching frequency of the power converter, the switching on/off duty ratio of the power converter, or combinations thereof.

The controller may be further configured to calculate at least one of the switching frequency of the power converter, the switching on/off duty ratio of the power converter according to the power conversion control signal and a clock signal, or combinations thereof, and to output the input power control signal, adjusting the switching on/off duty ratio of the power supply depending on whether a result of the calculation is outside of a reference range.

The controller may be further configured to output the power conversion control signal to comprise a first gate signal and a second gate signal, and to calculate switch on phases of the first gate signal and the second gate signal according to the power conversion control signal and a clock signal, and to output the input power control signal to adjust the switching on/off duty ratio of the power supply depending on whether a result of the calculation is outside of a reference range.

The controller may be further configured to employ the power conversion control signal as the input power control signal.

The controller may be further configured to transmit the input power control signal to an external variable adaptor supplying the input power to the power converter.

The power converter may include a full-bridge inverter or a half-bridge inverter.

According to another general aspect, a non-contact type power transfer apparatus includes a power converter configured to convert input power into transmission power; a power transmitter configured to transmit the transmission power in a non-contact type manner; and a controller configured to adjust a power level of the input power in response to a state of a power conversion operation of the power converter being outside of a reference range.

The non-contact type power transfer apparatus may further include a power supply configured to adjust the power level of the input power according to a control of the controller and to supply the varied power level of the input power to the power converter.

The controller may be further configured to adjust the power level of the input power in response to the state of the power conversion operation, the state of the power conversion operation comprising at least one of a switching frequency of the power converter, a switching on/off duty ratio of the power converter, or combinations thereof.

The controller may be further configured to adjust the power level of the input power depending on whether at least one of the switching frequency of the power converter, the switching on/off duty ratio of the power converter, or combinations thereof, are outside of the reference range.

The controller may be further configured to provide a first gate signal and a second gate signal to the power converter to control the power conversion operation of the power converter, and to adjust the power level of the input power depending on whether switch on phases of the first gate signal and the second gate signal are outside of the reference range.

The controller may be further configured to transmit the input power control signal to adjust the power level of the input power to an external variable adaptor supplying the input power to the power converter.

The power converter may include a full-bridge inverter or a half-bridge inverter.

According to another general aspect, a wireless power transfer apparatus, includes a power supply configured to provide a variable power responsive to a supply signal; a power converter coupled to the power supply, the power converter being configured to convert the variable power into a transmission power; and a controller configured to adaptively adjust the variable power of the power supply and an operational characteristic of the power converter, or combinations thereof, in response to a calculation performed on the transmission power.

The controller may include a processor configured to continuously calculate a switching frequency of the power converter relative to a reference clock; and, to adaptively adjust a duty ratio of the power converter in response to the calculated switching frequency to maintain the switching frequency within a predetermined range.

The power converter may include a switch; and, the controller may include a processor configured to generate a control signal for the switch of the power converter, to continuously calculate a duty ratio of the control signal output to the power converter, and to adaptively adjust the duty ratio of the control signal in response to the calculated duty ratio.

The power converter may include two switches; and, the controller may include a processor configured to generate two control signals respectively corresponding to the two switches for control thereof, to continuously calculate a phase difference between the control signals, and, to adaptively adjust a duty ratio of the switches in response to the calculated phase difference.

Other features and aspects will be apparent from the following detailed description, the drawings, and the claims.

BRIEF DESCRIPTION OF DRAWINGS

FIG. 5A is a diagram illustrating calculation of a power conversion frequency of the non-contact type power transfer apparatus, according one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
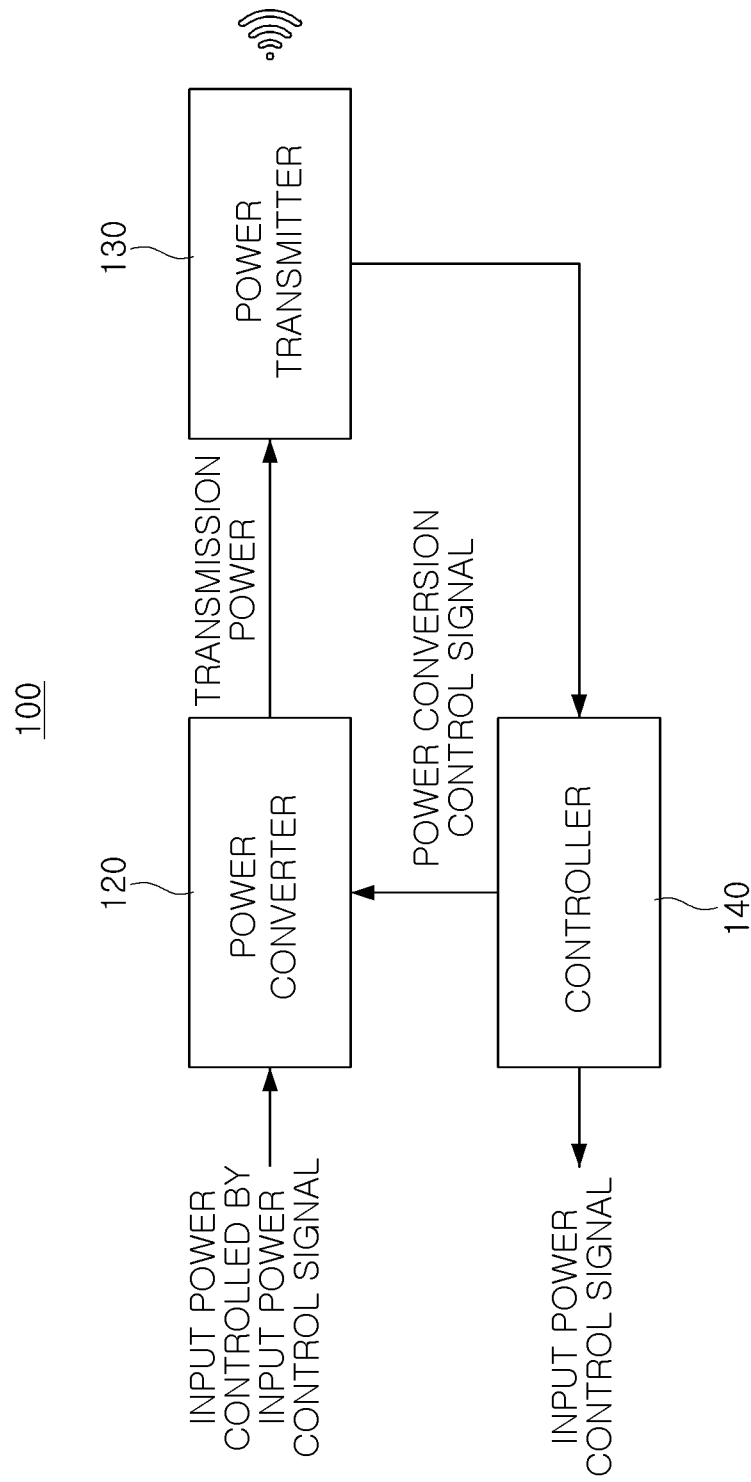
FIG. 1 is a schematic block diagram of a non-contact type power transfer apparatus according, to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there are no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views. In the drawings, for example, due to manufacturing techniques and/or tolerances, modifications of the shape shown may be estimated. Thus, embodiments of the present disclosure should not be construed as being limited to the particular shapes of regions shown herein, but should be understood to include, for example, changes in shape resulting from manufacturing. The following embodiments may also be constituted by one or a combination thereof.

Because wireless charging generally has lower charging power, as compared to existing wired chargers, in which rapid charging is generally available, there are problems that are disadvantageous in terms of a charging time, amongst other issues. Accordingly, a demand for increased output power of the wireless charging has grown A reason, amongst others, for the above-mentioned problems is that an output current of the wireless charging is generally decreased to reduce heating problems, which causes the wireless charging to have power conversion efficiency lower than that of an existing wired charging. Since the above-mentioned problems hinder the development of the wireless charging, research is ongoing into trying to improve efficiency of wireless charging in many aspects such as a circuit, a material, production, and the like.

FIG. 1 is a schematic block diagram of a non-contact type power transfer apparatus according to a first embodiment.

Referring to FIG. 1, a non-contact type power transfer apparatus 100 according to a first embodiment includes a power converter 120, a power transmitter 130, and a controller 140.

The power converter 120 is supplied with input power controlled by an input power control signal of the controller 140, and acts to convert the input power into transmission power to output the converted transmission power.

The power transmitter 130 transmits the transmission power from the power converter 120 to an external power receiver in a non-contact type manner via a resonator coil.

The controller 140 provides a power conversion control signal which controls a power conversion operation of the power converter 120 on the basis of a state of the transmission power, and provides the input power control signal controlling a power level of the input power on the basis of the power conversion control signal.

For example, in order to provide a request of the power receiver or transmission power having a set power level, the controller 140 provides the power conversion control signal to the power converter 120. Further, for example, in order to control a state of a power conversion operation of the power converter 120 to be maintained within a reference range, the controller 140 outputs the input power control signal on the basis of the power conversion control signal. In a case in which the state of the power conversion operation of the power converter 120 is out of the reference range, the controller 140 outputs an input power control signal for varying the power level of the input power.

Figure 2:
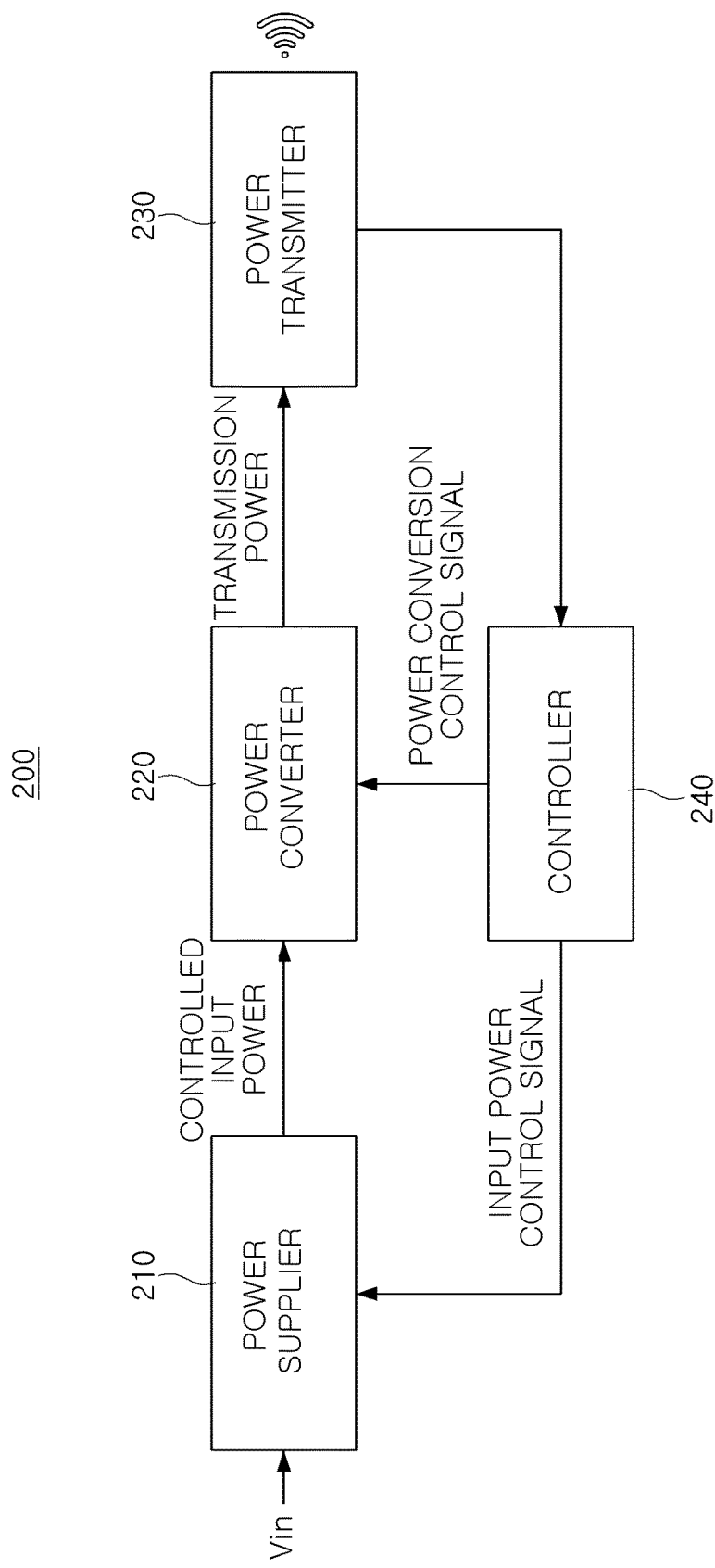
FIG. 2 is a schematic block diagram of a non-contact type power transfer apparatus, according to a second embodiment.

FIG. 2 is a schematic block diagram of a non-contact type power transfer apparatus according to a second embodiment.

Referring to FIG. 2, a non-contact type power transfer apparatus 200 according to an embodiment further includes a power supply 210 as compared to the non-contact type power transfer apparatus 100 according to the first embodiment illustrated in FIG. 1.

The power supply 210 supplies input power to a power converter 220, and varies a power level of the input power on the basis of an input power control signal output from a controller 240. For example, the controller 240 provides the input power control signal for controlling the power level of the input power to the power supply 210 on the basis of a power conversion control signal controlling a power conversion operation of the power converter 220.

Figure 3:
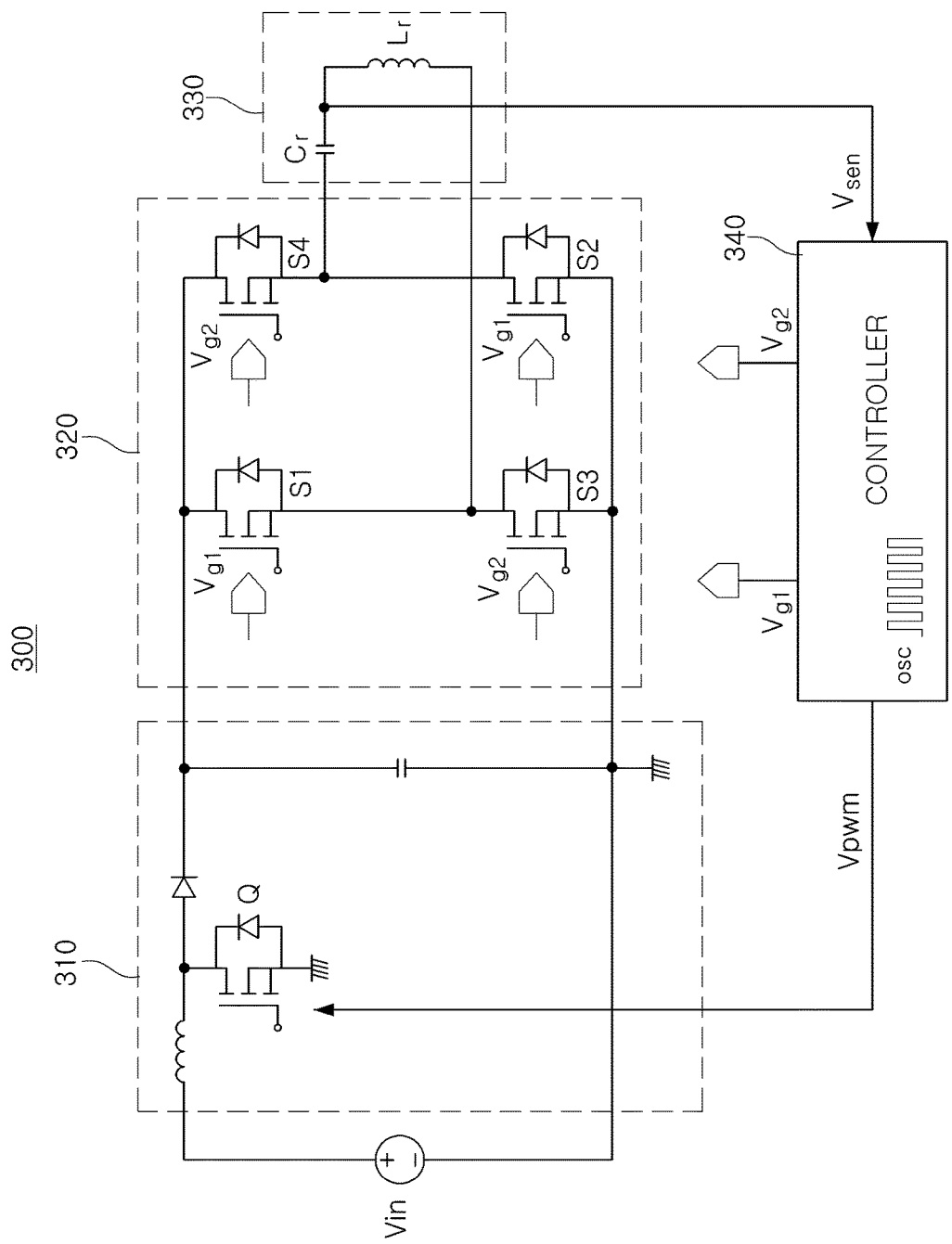
FIG. 3 is a schematic circuit diagram of a non-contact type power transfer apparatus, according to a third embodiment.

FIG. 3 is a schematic circuit diagram of a non-contact type power transfer apparatus according to a third embodiment.

Referring to FIG. 3, a non-contact type power transfer apparatus 300 according to a third embodiment includes a power supply 310 having at least one switch Q, a power converter 320 having one or more switches S1, S2, S3, and S4, a power transmitter 330 having a capacitor Cr and a coil Lr, and a controller 340.

The power supply 310 converts power Vin into input power by a switching operation of at least one switch Q. The power supply 310 includes a boost converter and/or a buck converter. At least one switch Q has a duty ratio varied by an input power control signal $V_{pwm}$ from the controller 340 to vary a power level of the input power.

The power converter 320 converts the input power from the power supply 310 into transmission power by switching operation of one or more switches S1, S2, S3, and S4. One or more switches S1, S2, S3, and S4 are full-bridge inverters in which a first switch S1 and a fourth switch S4 are disposed on a high side, and a third switch S3 and a second switch S2 are disposed on a low side. The controller 340 provides power conversion control signals $V_{g1}$ and $V_{g2}$ to control switching operations of the full-bridge inverters S1, S2, S3, and S4.

The power conversion control signals include a first gate signal $V_{g1}$ and a second gate signal $V_{g2}$. The first gate signal $V_{g1}$ is transferred to the first switch S1 and the second switch S2, and the second gate signal $V_{g2}$ is transferred to the third switch S3 and the fourth switch S4. The first gate signal $V_{g1}$ and the second gate signal $V_{g2}$ have signal levels which are opposed to each other. That is, in a case in which the first gate signal $V_{g1}$ is a high level signal, the second gate signal $V_{g2}$ is a low level signal. Conversely, in a case in which the first gate signal $V_{g1}$ is the low level signal, the second gate signal $V_{g2}$ is the high level signal.

Accordingly, if the first switch S1 and the second switch S2 are turned on, the third switch S3 and the fourth switch S4 are turned off. Conversely, if the first switch S1 and the second switch S2 are turned off, the third switch S3 and the fourth switch S4 are turned on. That is, the first and second switches S1 and S2, and the third and fourth switches S3 and S4 are operated complementarily to each other.

The power transmitter 330 includes a capacitor Cr and a coil Lr, and transmits the transmission power from the power converter 320 to an external power receiver in a non-contact type manner.

A power state Vsen of the transmission power is transferred to the controller 340, and the controller 340 controls a power conversion operation of the power converter 320 on the basis of the power state Vsen. According to the illustration of FIG. 3, the power state Vsen of the transmission power is detected from a connection point of the capacitor Cr and the coil Lr, but a detection position of the transmission power is not limited thereto. The power state Vsen of the transmission power is detected from various positions. For example, the power state Vsen is detected from connection points of the capacitor Cr and the second and fourth switches S2 and S4.

The controller 340 performs a control so that the power converter 320 performs a power conversion operation in a set reference range.

To this end, the controller 340 performs a control so that a switching frequency, a switching on/off duty ratio, and a switching on phase used for the power conversion operation of the power converter 320 are maintained within a reference range, and may perform a control so that at least one of the switching frequency, the switching on/off duty ratio, and the switching on phase belongs to the reference range by transmitting an input power control signal $V_{pwm}$ to the power supply 310 to vary the power level of the input power. Accordingly, the input power control signal $V_{pwm}$ is set on the basis of the power conversion control signals $V_{g1}$ and $V_{g2}$. The input power control signal $V_{pwm}$ controls the switching on/off duty ratio of at least one switch Q of the power supply 310.

Figure 4:
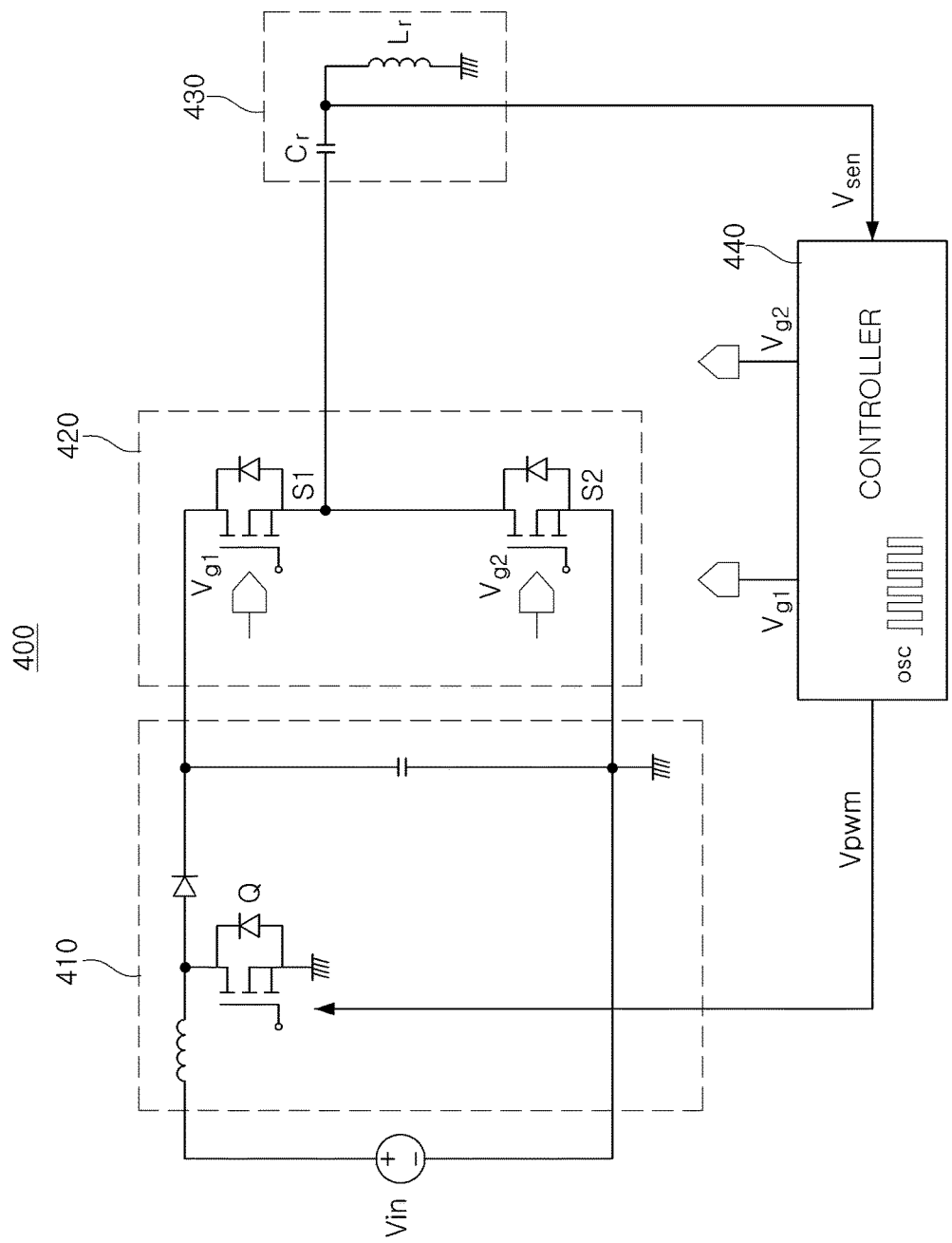
FIG. 4 is a schematic circuit diagram of a non-contact type power transfer apparatus, according to a fourth embodiment.

FIG. 4 is a schematic circuit diagram of a non-contact type power transfer apparatus according to a fourth embodiment.

Referring to FIG. 4, a power converter 420 of a non-contact type power transfer apparatus 400 according to a fourth embodiment includes a half-bridge inverter in which a first switch S1 is disposed on a high side, and a second switch S2 is disposed on a low side. The power converter 420 converts input power from a power supply 410 into transmission power by switching operations of the half-bridge inverters S1 and S2, and transfers the transmission power to the power transmitter 430. A controller 440 transfers the first gate signal $V_{g1}$ to the first switch S1 and transfers the second gate signal $V_{g2}$ to the second switch S2 to perform a control so that if the first switch S1 is turned on, the second switch S2 is turned off, and if the first switch S1 is turned off, the second switch S2 is turned on.

Figure 5B:
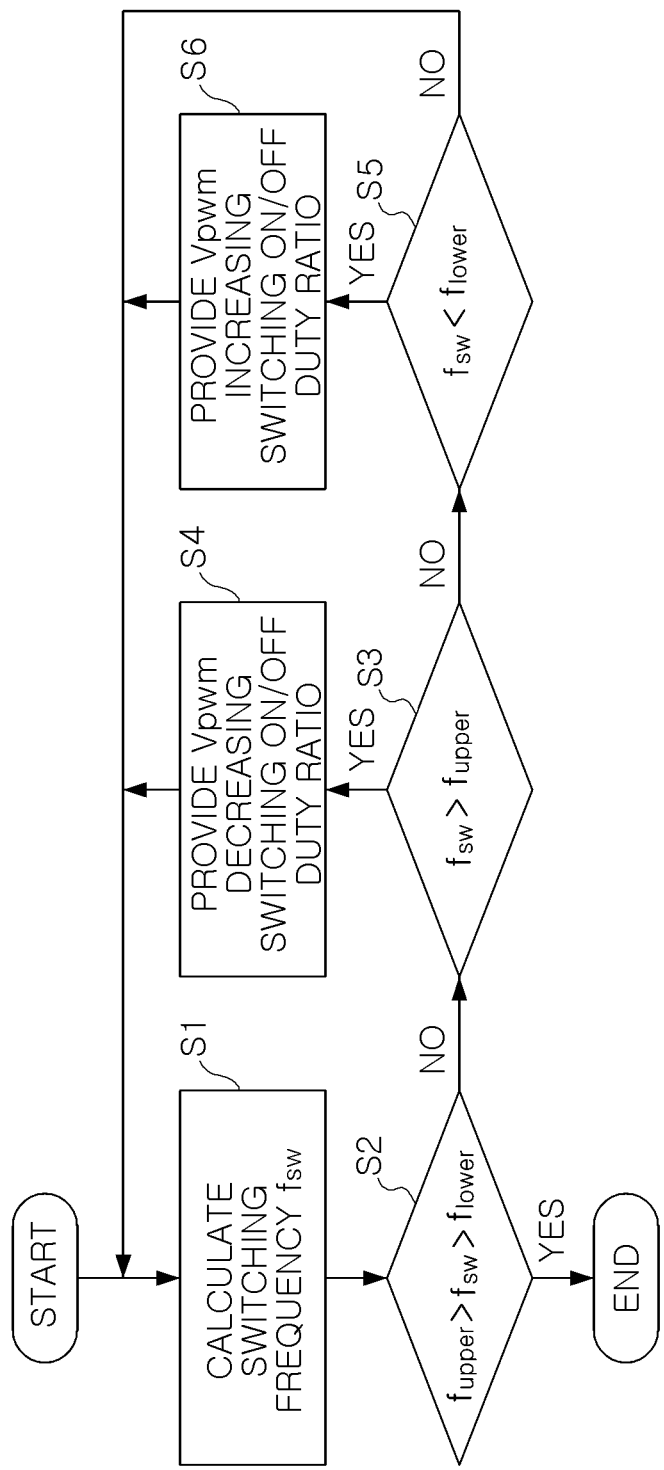
FIG. 5B is a flowchart illustrating a control operation of a power conversion frequency of the non-contact type power transfer apparatus, according to one or more embodiments.

FIG. 5A is a diagram illustrating calculation of a power conversion frequency of the non-contact type power transfer apparatus according to an embodiment, and FIG. 5B is a flowchart illustrating a control operation according to the power conversion frequency of the non-contact type power transfer apparatus according to an embodiment.

The controller illustrated in FIGS. 1 through 4 controls the power conversion operation of the power converter by a frequency modulation scheme, and calculates a power conversion frequency of the power converter according to a clock signal $V_{osc}$.

Referring to FIG. 5A, for example, the clock signal $V_{osc}$ has a signal configuration in which a high level and a low level are repeated. If a signal configuration of one high level and a successive one low level is set to one period $t_{osc}$ of a clock, it is calculated how many periods of the clock signal correspond to one period $t_{sw}$ (having one high level and a successive one low level) of the first gate signal $V_{g1}$ (or the second gate signal). According to a relationship between the period and the frequency, and a switching frequency used for the power conversion of the power converter, the correspondence may be calculated according to the period of the clock signal. In the frequency modulation scheme described above, the controller fixes the duty ratio of the power converter. For example, the duty ratio is fixed to 50%.

Referring to FIG. 5B, if the switching frequency $f_{sw}$ (calculated as described above) is within a reference range ($f_{lower} < f_{sw} < f_{upper}$), the controller maintains the power level of the input power from the power supply, and if the switching frequency $f_{sw}$ is out of the reference range ($f_{sw} < f_{lower}$) or ($f_{sw} > f_{upper}$) the controller adaptively adjusts the power level of the input power from the power supply. For example, if the switching frequency $f_{sw}$ is lower than a lower frequency of the reference range ($f_{sw} < f_{lower}$), the controller provides an input power control signal that increases a switching duty ratio of at least one switch of the power supply. Further, for example, if the switching frequency $f_{sw}$ is higher than an upper frequency of the reference range ($f_{sw} > f_{upper}$), the controller provides an input power control signal that decreases the switching duty ratio of at least one switch of the power supply.

Accordingly, in a case in which a voltage gain of the non-contact type power transfer apparatus should be increased, such as, for example, a load being increased, the voltage level of the transmission power being increased, due to the variation of conditions such as, for example, a position, angle, or a request, of a non-contact type power receiver, the controller performs an operation that decreases the switching frequency of the power converter. Here, the switching frequency is also reflected on an operation of the power supply to increase the voltage level of the input power, whereby the voltage gain is increased without significantly decreasing the switching frequency.

Conversely, in a case in which the voltage gain of the non-contact type power transfer apparatus is to be decreased, such as the load being decreased, the voltage level of the transmission power being decreased, or the like, the controller performs an operation that increases the switching frequency of the power converter. Here, the switching frequency is also reflected on the operation of the power supply to decrease the voltage level of the input power, whereby the voltage gain is decreased without significantly increasing the switching frequency.

That is, since the voltage gain is varied without being significantly out of a switching frequency condition performing a substantially optimal operation, there is an advantage that efficiency is improved in the loaded condition.

Figure 6A:
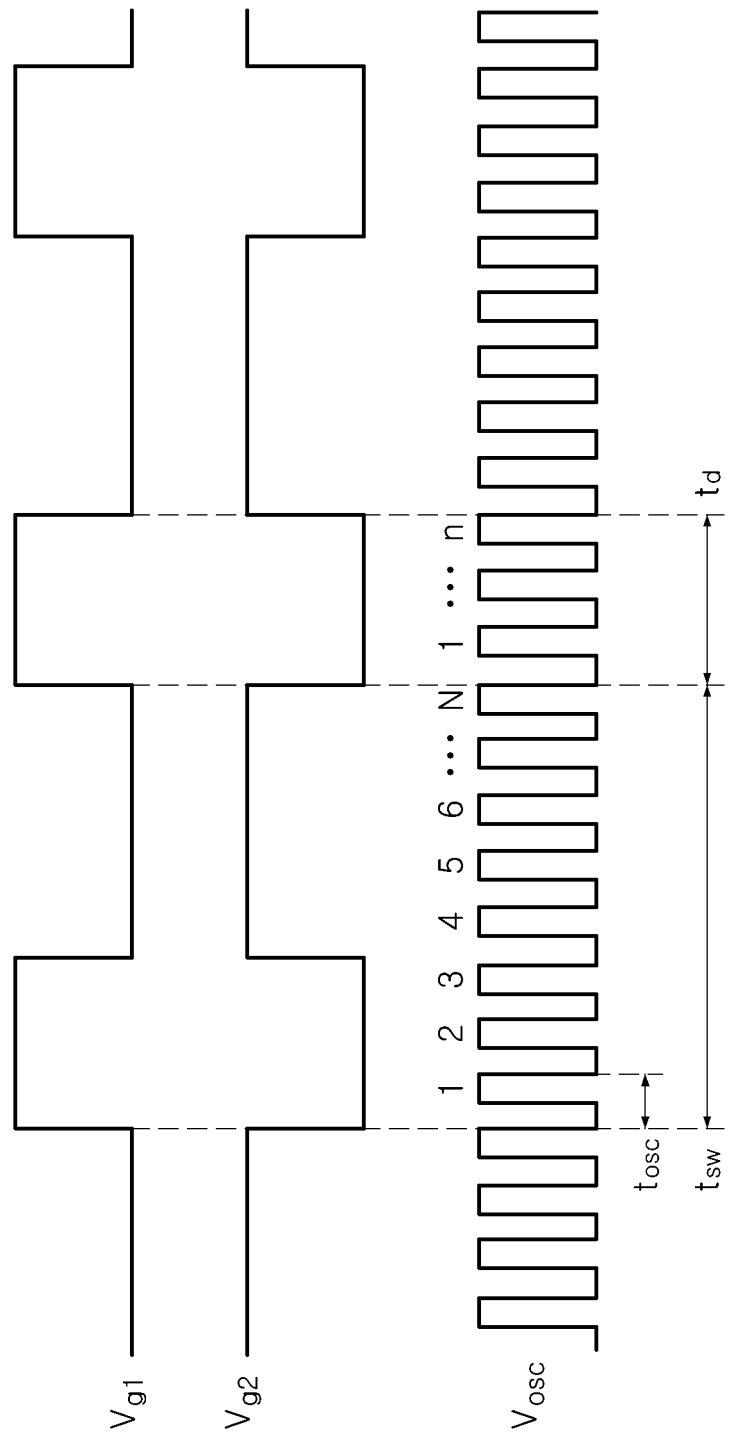
FIG. 6A is a diagram illustrating calculation of a power conversion duty ratio of the non-contact type power transfer apparatus, according to one or more embodiments.
Figure 6B:
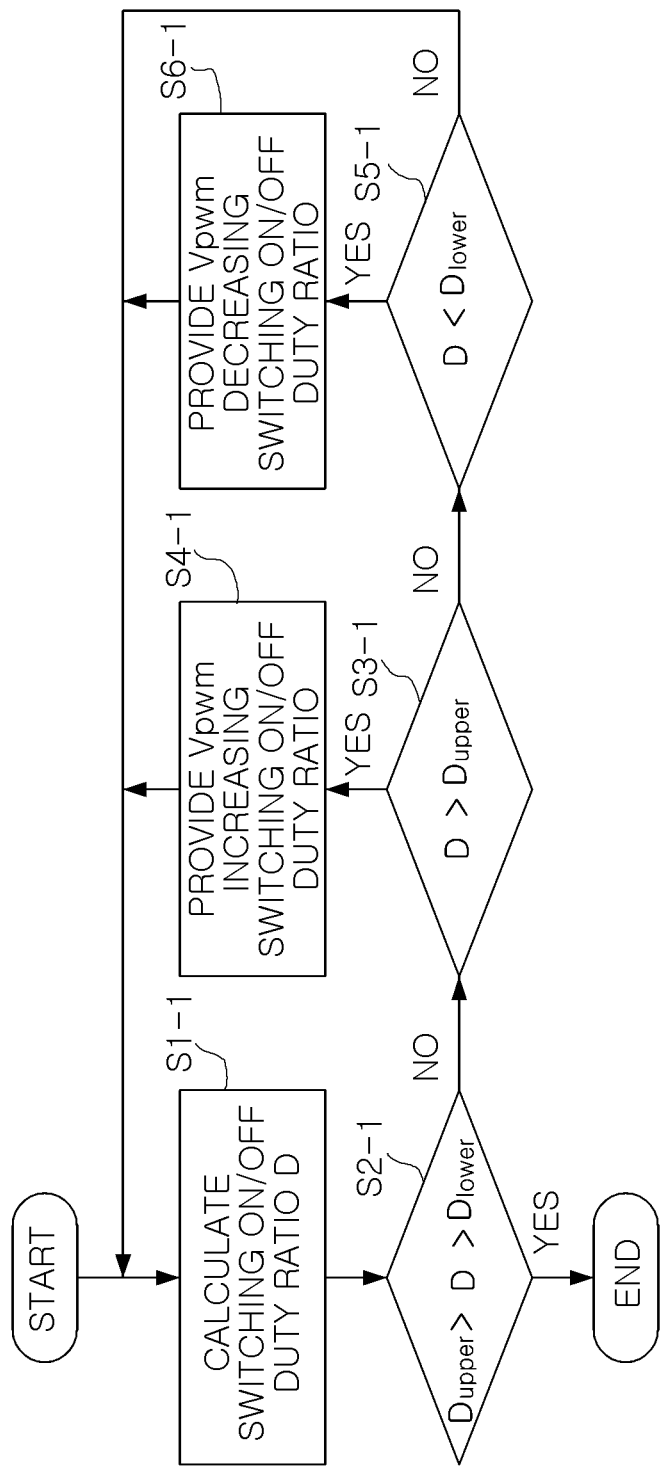
FIG. 6B is a flowchart illustrating a control operation of the power conversion duty ratio of a non-contact type power transfer apparatus according to one or more embodiments.

FIG. 6A is a diagram illustrating calculation of a power conversion duty ratio of the non-contact type power transfer apparatus according to one or more embodiments, and FIG. 6B is a flowchart illustrating a control operation according to the power conversion duty ratio of the non-contact type power transfer apparatus.

The controller controls the power conversion operation of the power converter by a duty ratio modulation scheme. Similar to FIG. 5A, referring to FIG. 6A, the clock signal $V_{osc}$ has a signal configuration in which a high level and a low level are repeated. If a signal configuration of one high level and a successive one low level is set to one period $t_{osc}$ of a clock, since it may be calculated whether the clock signal of how many periods corresponds to one period $t_{sw}$ having one high level and a successive one low level of the first gate signal $V_{g1}$ or the second gate signal $V_{g2}$, and it may be calculated whether the clock signal of how many periods corresponds to on duty or off duty of the first gate signal $V_{g1}$ (or the second gate signal $V_{g2}$ ($t_d$)), a duty ratio of the first gate signal $V_{g1}$ (or the second gate signal $V_{g2}$) is able to be calculated. In the duty ratio modulation scheme described above, the controller fixes the switching frequency of the power converter.

Referring to FIG. 6B, if the switching on/off duty ratio D of the power converter (calculated, for example, as described above) is within a reference range ($D_{lower}$<D<$D_{upper}$), the controller maintains the power level of the input power from the power supply, and if the switching on/off duty ratio D is out of the reference range (D<$D_{lower}$) or (D>$D_{upper}$), the controller adaptively adjusts the power level of the input power from the power supply to maintain the duty ratio D within the reference range. For example, if the switching on/off duty ratio D is lower than a lower duty ratio of the reference range (D<$D_{lower}$), the controller provides an input power control signal that decreases a switching duty ratio of at least one switch of the power supply to the power supply. Further, for example, if the switching on/off duty ratio D is higher than an upper duty ratio of the reference range (D>$D_{upper}$), the controller provides an input power control signal that increases the switching duty ratio of at least one switch of the power supply.

Accordingly, in a case in which the voltage gain of the non-contact type power transfer apparatus should be increased, such as, for example, the load being increased, the voltage level of the transmission power being increased, the controller performs an operation that increases the switching on/off duty ratio of the power converter. Here, the switching on/off duty ratio is also reflected on the operation of the power supply to increase the voltage level of the input power, whereby the voltage gain may be increased without significantly increasing the switching on/off duty ratio.

Conversely, in a case in which the voltage gain of the non-contact type power transfer apparatus needs to be decreased, such as the load being decreased, the voltage level of the transmission power being decreased, or the like, the controller performs an operation that decreases the switching on/off duty ratio of the power converter. Here, the switching on/off duty ratio is also reflected on the operation of the power supply to decrease the voltage level of the input power, whereby the voltage gain is decreased without significantly decreasing the switching on/off duty ratio.

That is, since the voltage gain is varied without being significantly out of a switching on/off duty ratio condition performing an optimal operation, there is an advantage that efficiency is improved in the load condition.

Figure 7A:
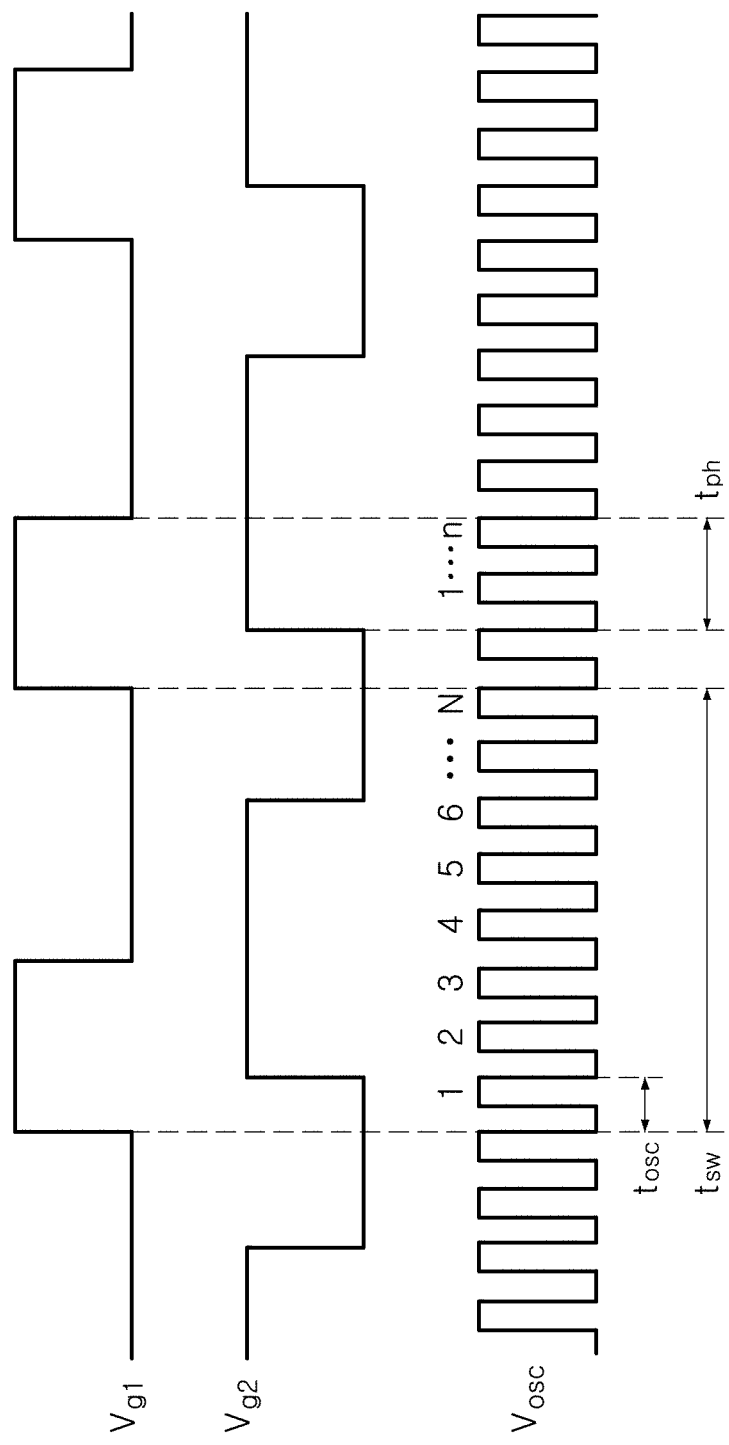
FIG. 7A is a diagram illustrating calculation of a phase of the non-contact type power transfer apparatus according to an embodiment.
Figure 7B:
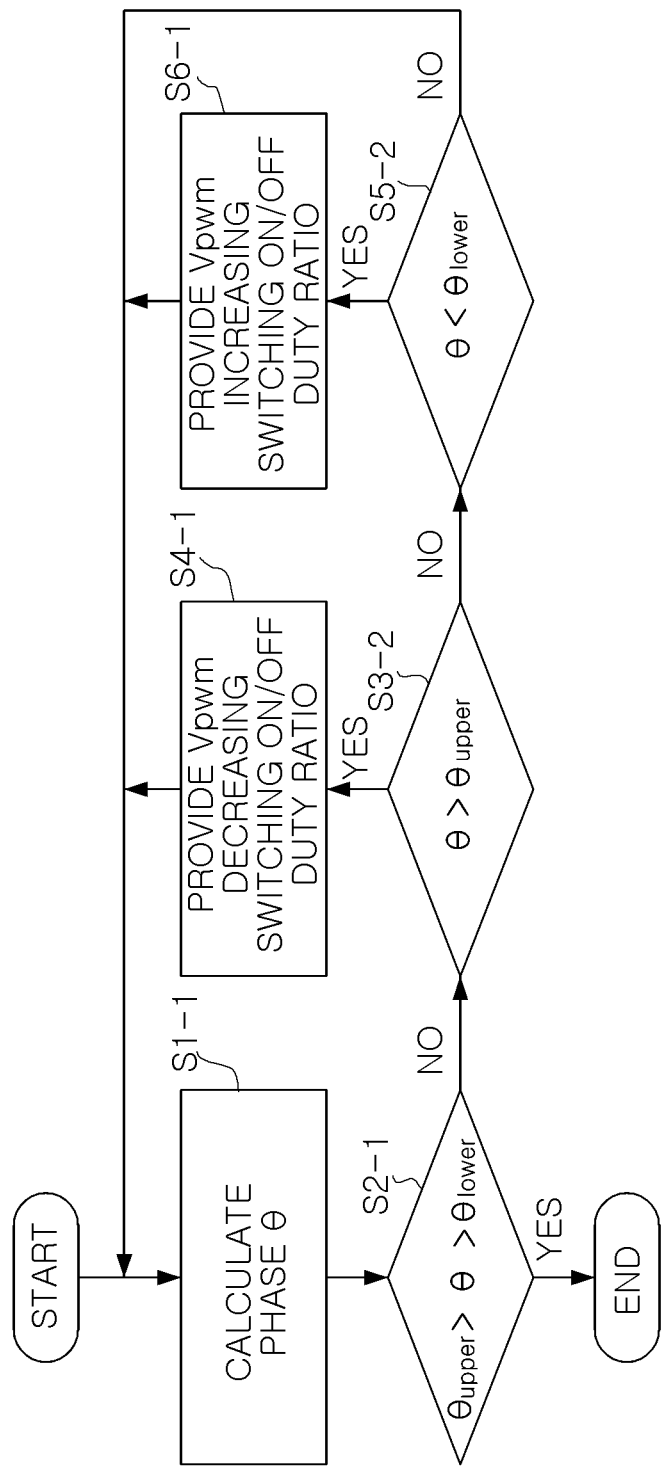
FIG. 7B is a flowchart illustrating a control operation according to the phase of the non-contact type power transfer apparatus according to an embodiment.

FIG. 7A is a diagram illustrating calculation of a phase of the non-contact type power transfer apparatus according to one or more embodiments, and FIG. 7B is a flowchart illustrating a control operation based on the phase of the non-contact type power transfer apparatus according to one or more embodiments.

The controller controls the power conversion operation of the power converter by a phase modulation scheme according to one or more embodiments. Similar to those described in FIGS. 5A and 6A, referring to FIG. 7A, the clock signal $V_{osc}$ has a signal configuration in which a high level and a low level are repeated. If a signal configuration of one high level and a successive one low level is set to one period $t_{osc}$ of a clock (since it may be calculated how many periods of the clock signal correspond to one period $t_{sw}$ having one high level and a successive one low level) of the first gate signal $V_{g1}$ (or the second gate signal $V_{g2}$) it may be calculated how many periods of the clock signal correspond to one period of the first gate signal $V_{g1}$ (or the second gate signal $V_{g2}$) and it may be calculated how many periods of the clock signal correspond to on duty (or off duty) of the first gate signal and the second gate signal $V_{g1}$ and $V_{g2}$ ($t_{ph}$), and a switch on phase θ between the first gate signal and the second gate signal $V_{g1}$ and $V_{g2}$ may be calculated according to the following Equation 1.

$$\theta=(n/N)*360 \quad \text{(Equation 1)}$$

Here, n is a period of the clock signal $V_{osc}$ corresponding to the on duty or the off duty of the first gate signal $V_{g1}$ or the second gate signal $V_{g2}$, and N is a period of the clock signal $V_{osc}$ corresponding to one period of the first gate signal $V_{g1}$ or the second gate signal $V_{g2}$.

In the phase modulation scheme described above, the controller fixes the switching frequency and the switching on/off duty ratio of the power converter. For example, the switching on/off duty ratio is fixed to 50%.

Referring to FIG. 7B, if the phase θ (calculated as described above) is within a reference range ($\theta_{lower}$<θ<$\theta_{upper}$), the controller maintains the power level of the input power from the power supply, and if the phase θ is out of the reference range (θ<$\theta_{lower}$) or (θ>$\theta_{upper}$), the controller adaptively adjusts the power level of the input power from the power supply.

For example, if the phase θ is lower than a lower phase of the reference range (θ<$\theta_{lower}$) the controller provides an input power control signal that increases a switching duty ratio of at least one switch of the power supply.

Further, for example, if the phase θ is higher than an upper phase of the reference range (θ>$\theta_{upper}$) the controller may provide an input power control signal that decreases the switching duty ratio of at least one switch of the power supply.

Similarly, in a case in which the voltage gain of the non-contact type power transfer apparatus should be increased or decreased, such as, for example, the load being changed or the voltage level of the transmission power being increased or decreased, since the power converter may vary the voltage gain within the reference range including the substantially optimal operation point by varying the voltage level of the input power from the power supply, there is an advantage in that efficiency is improved throughout the range of the loaded condition.

However, it may be difficult to apply the phase modulation scheme described above to the half-bridge inverters S1 and S2 of the power converter 420 of the non-contact type power transfer apparatus 400 according to the fourth embodiment illustrated in FIG. 4.

Figure 8:
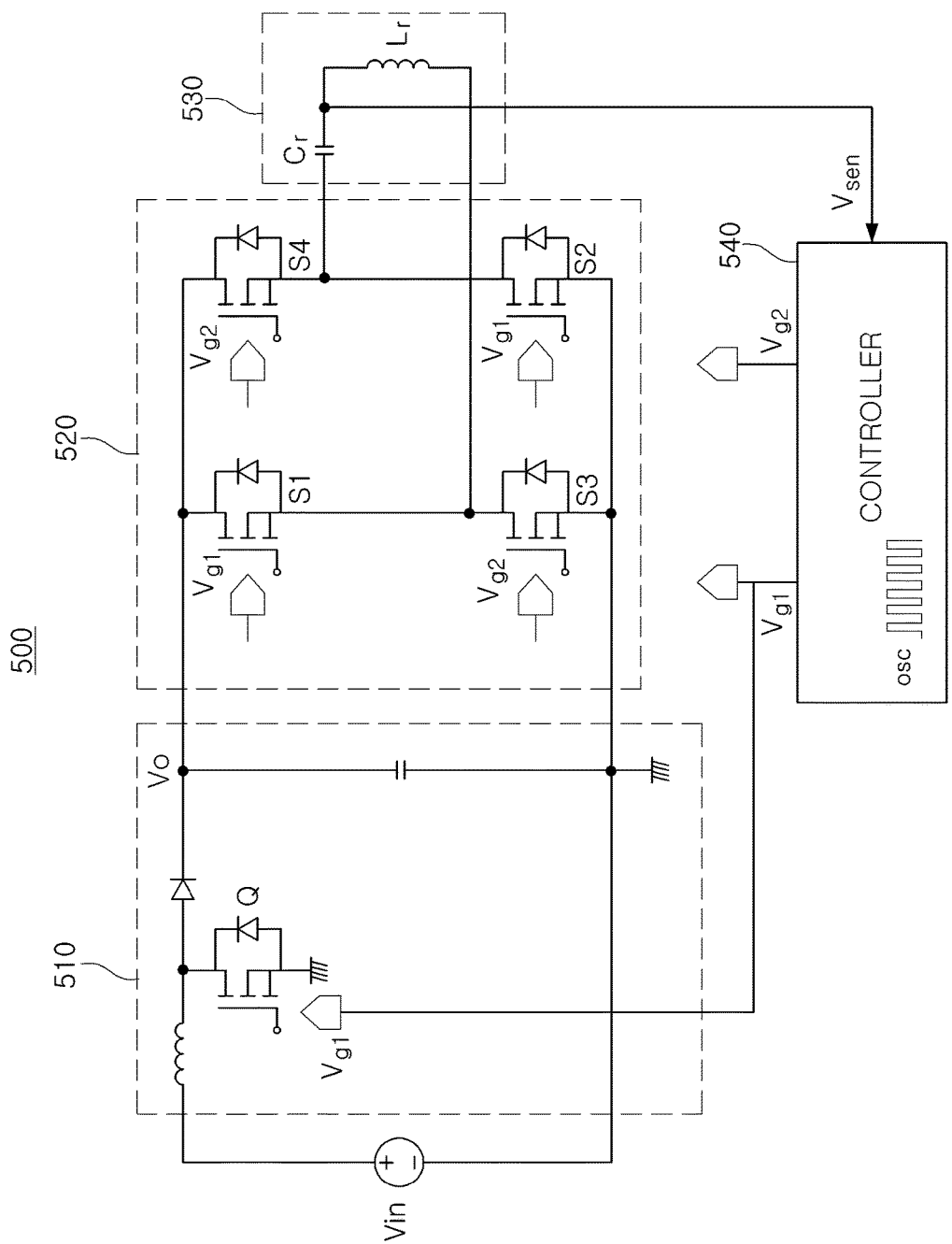
FIG. 8 is a schematic circuit diagram of a non-contact type power transfer apparatus according to a fifth embodiment.

FIG. 8 is a schematic circuit diagram of a non-contact type power transfer apparatus according to a fifth embodiment.

Referring to FIG. 8, a controller 540 of a non-contact type power transfer apparatus 500 according to a fifth embodiment provides power conversion control signals $V_{g1}$ and $V_{g2}$ controlling a power conversion operation of a power converter 520 to a power supply 510 as the input power control signal.

For example, the controller 540 provides the first gate signal $V_{g1}$ (or the second gate signal $V_{g2}$) to the power supply 510 as the input power control signal. In a case in which the power level of the transmission power transmitted externally by a power transmitter 530 should be increased, the controller 540 provides the power conversion control signals $V_{g1}$ and $V_{g2}$ that increase duty ratios of the full-bridge inverters S1, S2, S3, and S4 of the power converter 520 to the power converter 520. If the controller 540 provides the first gate signal $V_{g1}$ or the second gate signal $V_{g2}$ to the power supply 510 as the input power control signal, the switching duty ratio of at least one switch Q of the power supply 510 is increased to increase the power level of the input power. Accordingly, the power level of the transmission power transmitted to the power transmitter 530 from the power converter 520 is increased.

Further, similarly, in a case in which the power level of the transmission power is decreased, the controller 540 provides the power conversion control signals $V_{g1}$ and $V_{g2}$ that decrease the duty ratios of the full-bridge inverters S1, S2, S3, and S4 of the power converter 520 to the power converter 520. If the controller 540 provides the first gate signal $V_{g1}$ or the second gate signal $V_{g2}$ to the power supply 510 as the input power control signal, the switching duty ratio of at least one switch Q of the power supply 510 is decreased to decrease the power level of the input power. Accordingly, the power level of the transmission power transmitted to the power transmitter 530 from the power converter 520 is decreased.

Examples of a method for varying the power level of the input power described above include the duty ratio modulation scheme and the frequency modulation scheme described above.

In the frequency modulation scheme, for example, if the power supply 510 is operated in a continuous current mode (CCM), a relationship between the switching duty ratio D of the power converter 520 and an output voltage $V_o$ (a voltage level of the input power) according to a voltage $V_{IN}$ input to the power supply is expressed by the following Equation 2.

$$V_O = \frac{1}{1-D} V_{IN} \qquad \text{(Equation 2)}$$

That is, in the case in which the power supply 510 is operated in the CCM, the output voltage is determined by only the duty ratio D regardless of the operation frequency. Meanwhile, if the power supply 510 is operated in a discontinuous current mode (DCM), a relationship between the switching duty ratio D and the output voltage $V_o$ (the voltage level of the input power) according to the voltage $V_{IN}$ input to the power supply is expressed by the following Equation 3.

$$V_O = \frac{(DV_{IN})^2}{2 \times I_O \times L \times f} + V_{IN} \qquad \text{(Equation 3)}$$

Here, $I_o$ means an output current of the power supply 510, L means inductance, and f means a switching frequency.

That is, in the case in which the power supply 510 is operated in the DCM, the output voltage is influenced by the switching frequency f as well as the duty ratio D. In a condition in which the duty ratio is approximately 50%, if the switching frequency is decreased, the output voltage rises, and if the switching frequency is increased, the output voltage drops.

When the above-mentioned characteristics are used, in a case in which the voltage gain of the power converter 520 should be increased, such as, for example, the load being increased or the output voltage being increased, the controller 540 performs an operation that decreases the switching frequency of the power converter 520. Since the switching frequency increases the voltage level of the input power supplied from the power supply 510, the voltage gain is increased without significantly decreasing the switching frequency of the power converter 520.

Conversely, in a case in which the voltage gain of the power converter 520 should be decreased, such as, for example, the load being decreased, a position or angular change, or the output voltage being decreased, the controller 540 performs an operation that increases the switching frequency of the power converter 520. Since the switching frequency decreases the voltage level of the input power supplied from the power supply 510, the voltage gain is decreased without significantly increasing the switching frequency.

That is, since the voltage gain is varied without being significantly out of a switching frequency range condition performing a substantially optimal operation, there is an advantage in that the efficiency is improved throughout the range of the load conditions.

Figure 9:
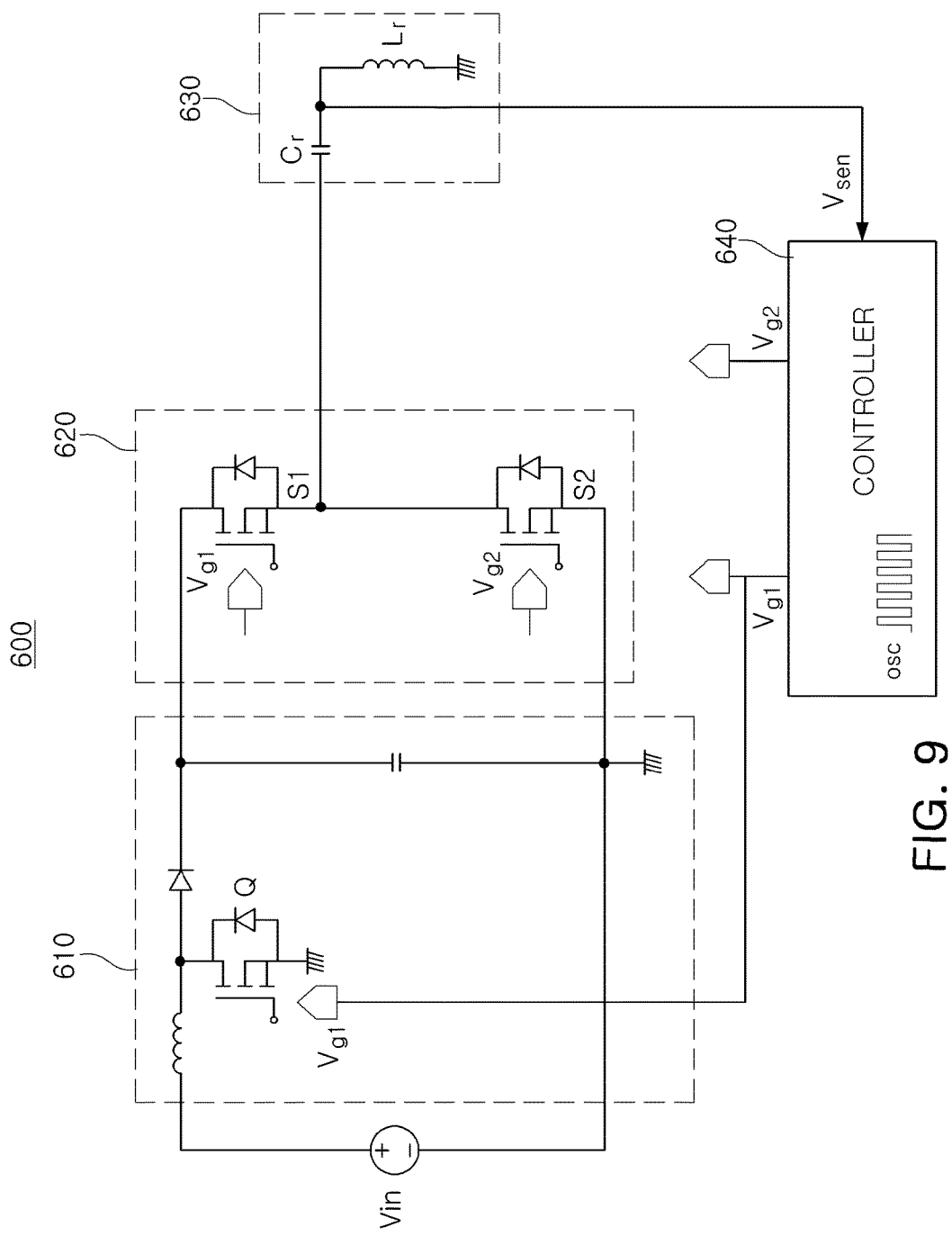
FIG. 9 is a schematic circuit diagram of a non-contact type power transfer apparatus according to a sixth embodiment.

FIG. 9 is a schematic circuit diagram of a non-contact type power transfer apparatus according to a sixth embodiment.

Referring to FIG. 9, a power converter 620 of a non-contact type power transfer apparatus 600 according to a sixth embodiment includes half-bridge inverters S1 and S2, and a controller 640 provides the first and second gate signals $V_{g1}$ and $V_{g2}$ controlling a power conversion operation of the half-bridge inverters S1 and S2 to the power converter 620 and a power supply 610.

The input power controlled by the first and second gate signals $V_{g1}$ and $V_{g2}$ is converted into the transmission power by the power converter 620, and a power transmitter 630 which transmits the transmission power from the power converter 620 externally in the non-contact type manner.

Examples of a method for varying the power level of the input power described above includes the duty ratio modulation scheme and the frequency modulation scheme described above, and since a description thereof is similar to the description of FIG. 8, the description will be omitted for clarity and conciseness.

Figure 10:
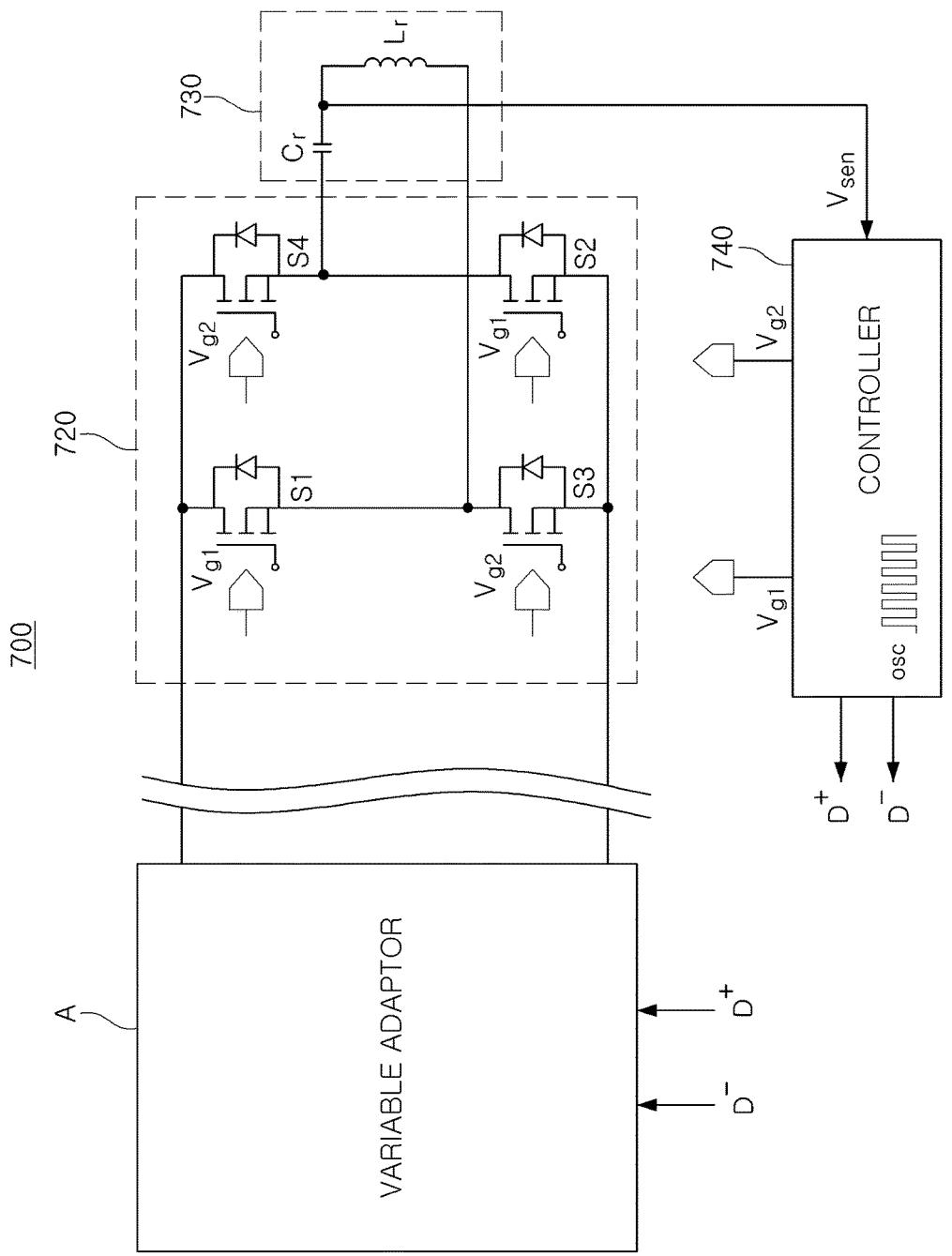
FIG. 10 is a schematic circuit diagram of a non-contact type power transfer apparatus according to a seventh embodiment.

FIG. 10 is a schematic circuit diagram of a non-contact type power transfer apparatus according to a seventh embodiment.

Referring to FIG. 10, a non-contact type power transfer apparatus 700 according to a seventh embodiment is supplied with the input power from an external variable adaptor A, and a controller 740 provides input power control signals D+ and D− controlling an input power supplying operation of the variable adaptor A on the basis of the power conversion control signals $V_{g1}$ and $V_{g2}$ controlling a power conversion operation of full-bridge inverters S1, S2, S3, and S4 of a power converter 720 to the variable adaptor A. Accordingly, the controller 740 performs a control so that a state of the power conversion operation of the full-bridge inverters S1, S2, S3, and S4 of the power converter 720 is maintained within a reference range. A power transmitter 730 transmits the transmission power from the power converter 720 to an external power receiver in the non-contact type manner.

Figure 11:
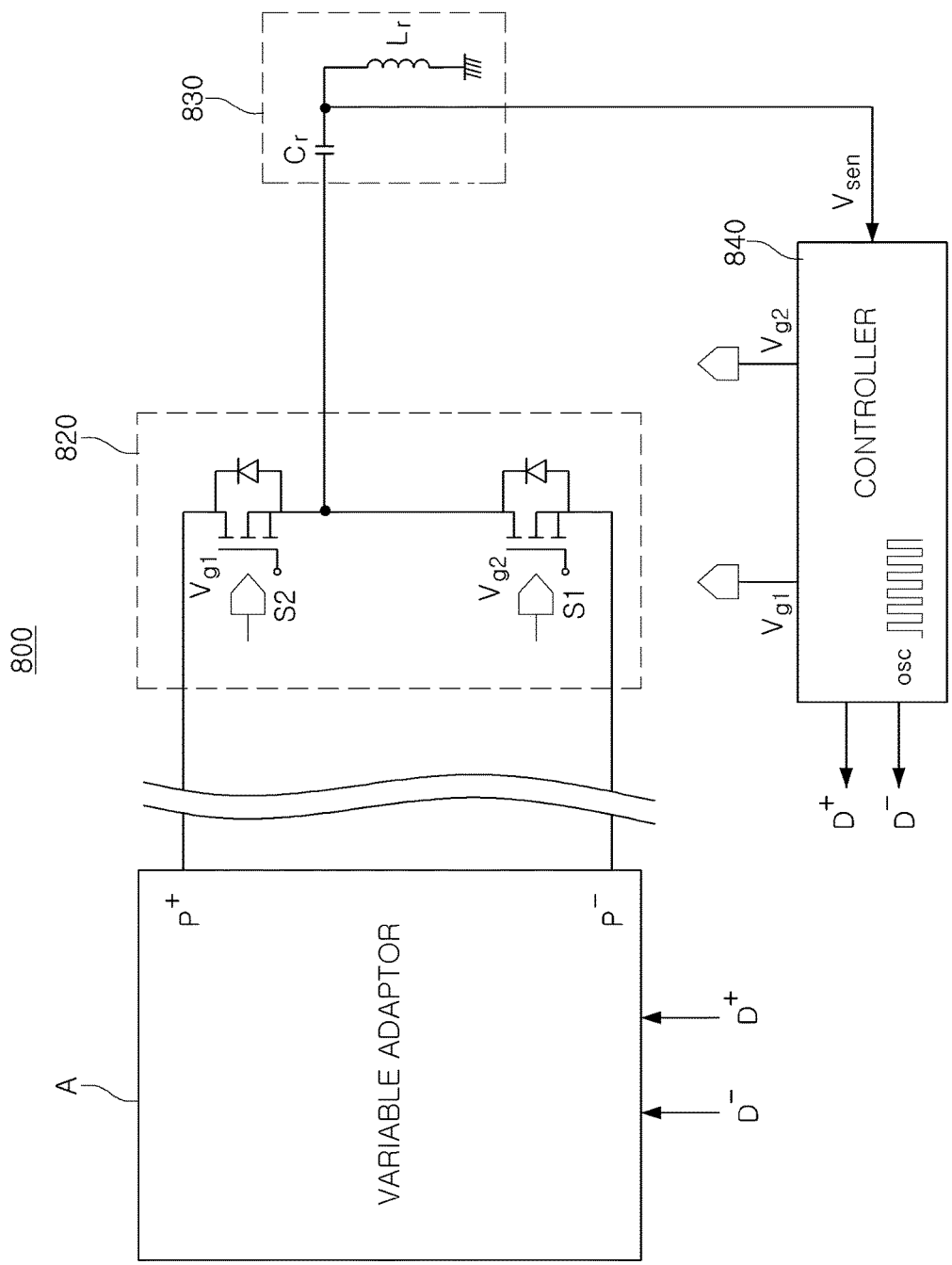
FIG. 11 is a schematic circuit diagram of a non-contact type power transfer apparatus according to an eighth embodiment.

FIG. 11 is a schematic circuit diagram of a non-contact type power transfer apparatus according to an eighth embodiment.

Referring to FIG. 11, a power converter 820 of a non-contact type power transfer apparatus 800 according to an eighth embodiment includes half-bridge inverters S1 and S2, and a controller 840 provides input power control signals D+ and D− controlling an input power supplying operation of the variable adaptor A on the basis of the power conversion control signals $V_{g1}$ and $V_{g2}$ controlling a power conversion operation of the half-bridge inverters S1 and S2 to the variable adaptor A. Accordingly, the controller 840 performs a control so that a state of the power conversion operation of the half-bridge inverters S1 and S2 of the power converter 820 are maintained within a reference range. A power transmitter 830 transmits the e.g. electromagnetic or magnetic transmission of power from the power converter 820 to an external power receiver in the non-contact transmission type such as, for example, a resonant mode or inductive mode.

Figure 12:
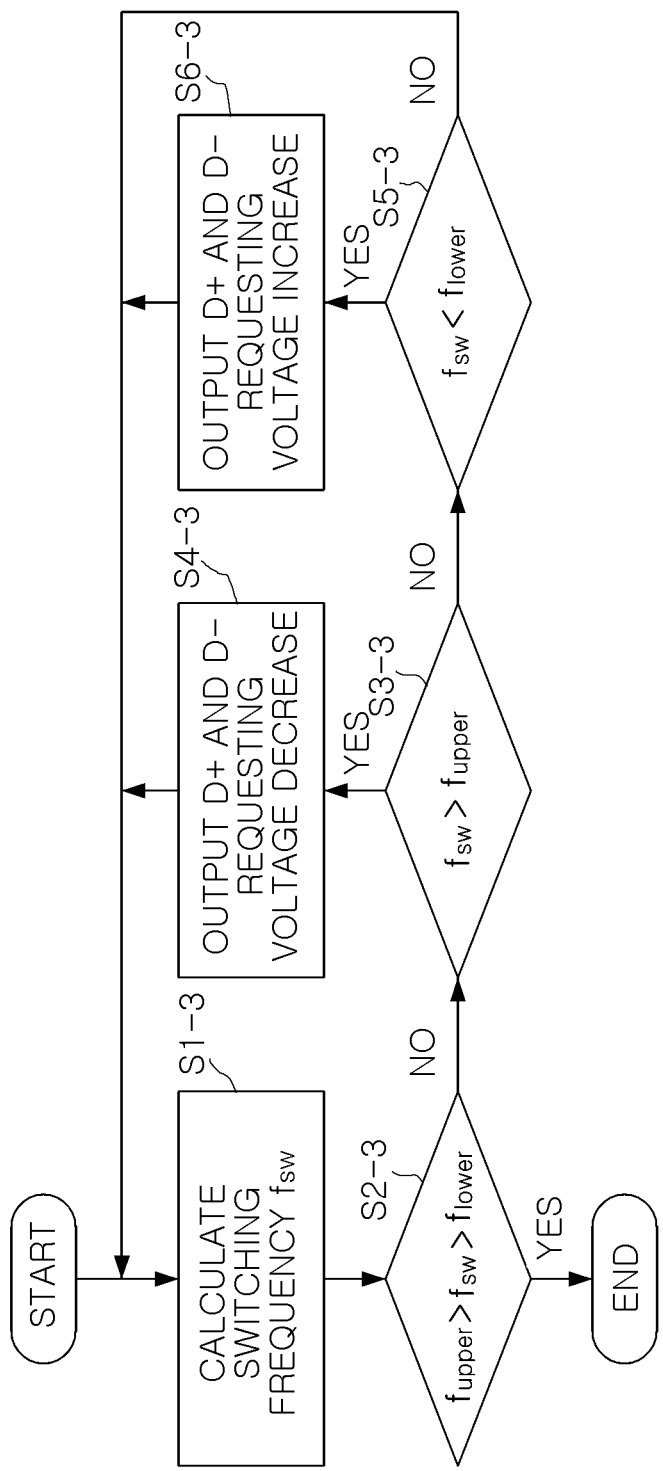
FIG. 12 is a flowchart illustrating a control operation according to a power conversion frequency of the non-contact type power transfer apparatus according to an embodiment.

FIG. 12 is a flowchart illustrating a control operation according to a power conversion frequency of the non-contact type power transfer apparatus according to one or more embodiments.

Referring to FIG. 12, the controller illustrated in, for example, FIGS. 10 and/or 11 control the power conversion operation of the power converter by the frequency modulation scheme, and the switching frequency of the power converter is calculated as described in FIG. 5A.

If the switching frequency $f_{sw}$, calculated as described above, is within the reference range ($f_{lower} < f_{sw} < f_{upper}$), the controller maintains the power level of the input power transferred from the variable adaptor, and if the switching frequency $f_{sw}$ is out of the reference range ($f_{sw} < f_{lower}$) or ($f_{sw} > f_{upper}$), the controller makes a request for a variation of the power level of the input power transferred from the variable adaptor.

For example, if the switching frequency $f_{sw}$ is higher than the upper frequency of the reference range ($f_{sw} > f_{upper}$), the controller provides the input power control signals D+ and D− requesting that the voltage level of the input power transferred from the variable adaptor be decreased to the variable adaptor.

Further, for example, if the switching frequency $f_{sw}$ is lower than the lower frequency of the reference range ($f_{sw} < f_{lower}$), the controller provides the input power control signals D+ and D− requesting that the voltage level of the input power transferred from the variable adaptor is increased to the variable adaptor.

For example, the controller requests the variable adaptor to vary the voltage level of the input power by varying the voltage level of the input power control signals D+ and D−.

Accordingly, in a case in which the voltage gain of the non-contact type power transfer apparatus should be increased, such as a load being increased or the voltage level of the transmission power being increased, or combinations thereof due to the variation of conditions such as, for example, a position, a request, and combinations thereof of the non-contact type power receiver, the controller, according to one or more embodiments, performs an operation that decreases the switching frequency of the power converter. Here, the voltage gain is increased without significantly decreasing the switching frequency by increasing the voltage level of the input power transferred from the variable adaptor.

Conversely, in a case in which the voltage gain of the non-contact type power transfer apparatus should be decreased, such as, for example, the load being decreased, the voltage level of the transmission power being decreased, or combinations thereof, the controller, according to one or more embodiments, performs an operation that increases the switching frequency of the power converter. The voltage gain is decreased without significantly increasing the switching frequency by decreasing the voltage level of the input power transferred from the variable adaptor. That is, since the voltage gain is varied without departing significantly from a switching frequency condition range performing a substantially optimal operation, there is an advantage in that efficiency is improved across a range of load conditions.

Figure 13:
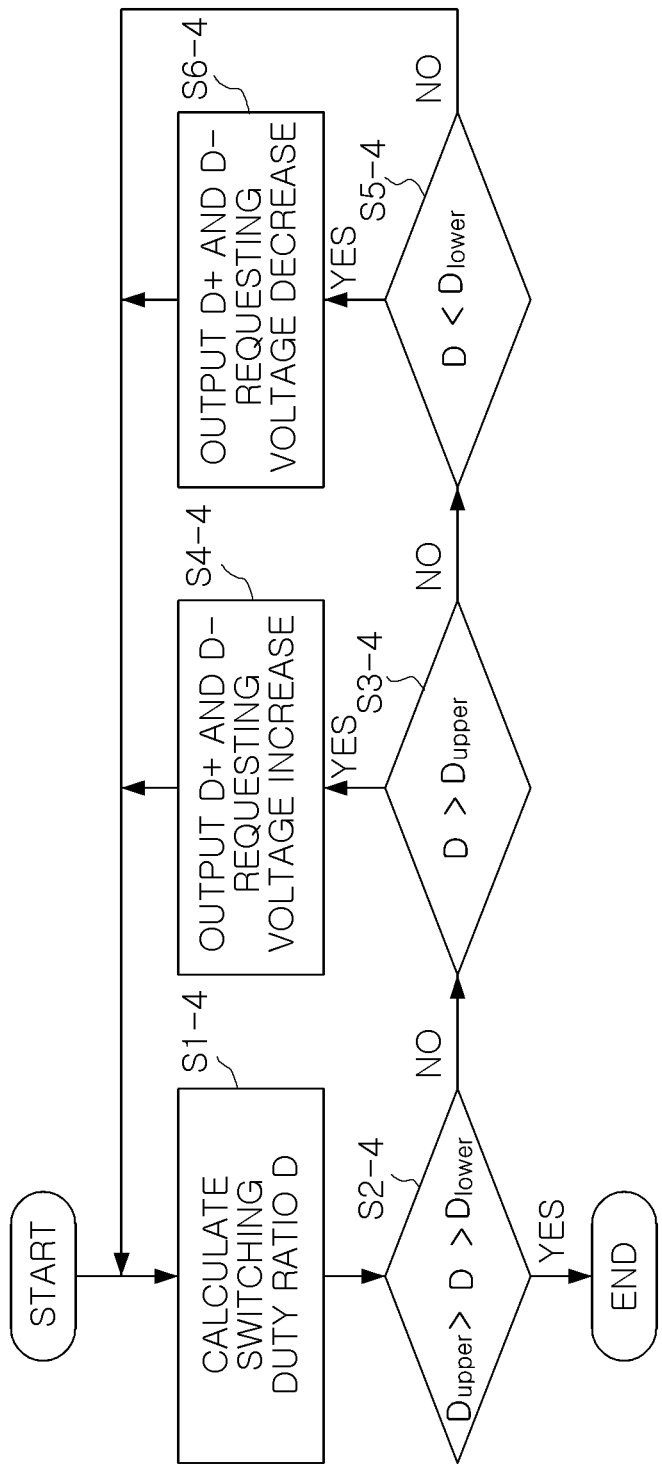
FIG. 13 is a flowchart illustrating a control operation according to a power conversion duty ratio of the non-contact type power transfer apparatus according to an embodiment.

FIG. 13 is a flowchart illustrating a control operation according to a power conversion duty ratio of the non-contact type power transfer apparatus according to one or more embodiments.

Referring to FIG. 13, the controller illustrated in, for example, FIGS. 10 and 11 controls the power conversion operation of the power converter by the duty ratio modulation scheme, and the power conversion switching duty ratio of the power converter is calculated as described in FIG. 6A.

If the calculated duty ratio D is within the reference range ($D_{lower} < D < D_{upper}$), the controller maintains the power level of the input power, and if the duty ratio D is out of the reference range ($D < D_{lower}$) and ($D > D_{upper}$), the controller makes a request for a variation of the power level of the input power transferred from the variable adaptor.

For example, if the duty ratio D is higher than the upper duty ratio of the reference range ($D > D_{upper}$), the controller provides the input power control signal requesting that the voltage level of the input power transferred from the variable adaptor is increased to the variable adaptor. Further, for example, if the duty ratio D is lower than the lower duty ratio of the reference range ($D < D_{lower}$), the controller provides the input power control signal requesting that the voltage level of the input power transferred from the variable adaptor is decreased to the variable adaptor.

Accordingly, in a case in which the voltage gain of the non-contact type power transfer apparatus should be increased, such as, for example, the load being increased or the voltage level of the transmission power being increased, or combinations thereof, the controller performs an operation that increases the switching duty ratio of the power converter. Further, the controller increases the voltage gain without significantly increasing the switching duty ratio by varying the voltage level of the input power control signal to increase the voltage level of the input power transferred from the variable adaptor and increasing the voltage level of the input power.

Conversely, in a case in which the voltage gain of the non-contact type power transfer apparatus should be decreased, such as the load being decreased or the voltage level of the transmission power being decreased, or combinations thereof, the controller decreases the voltage gain without significantly decreasing the switching duty ratio by varying the voltage level of the input power control signal to decrease the voltage level of the input power transferred from the variable adaptor of the power converter and decreasing the voltage level of the input power.

That is, since the voltage gain is varied without departing significantly from a switching duty ratio condition performing a substantially optimal operation, there is an advantage in that efficiency is improved a broad range of load conditions.

Figure 14:
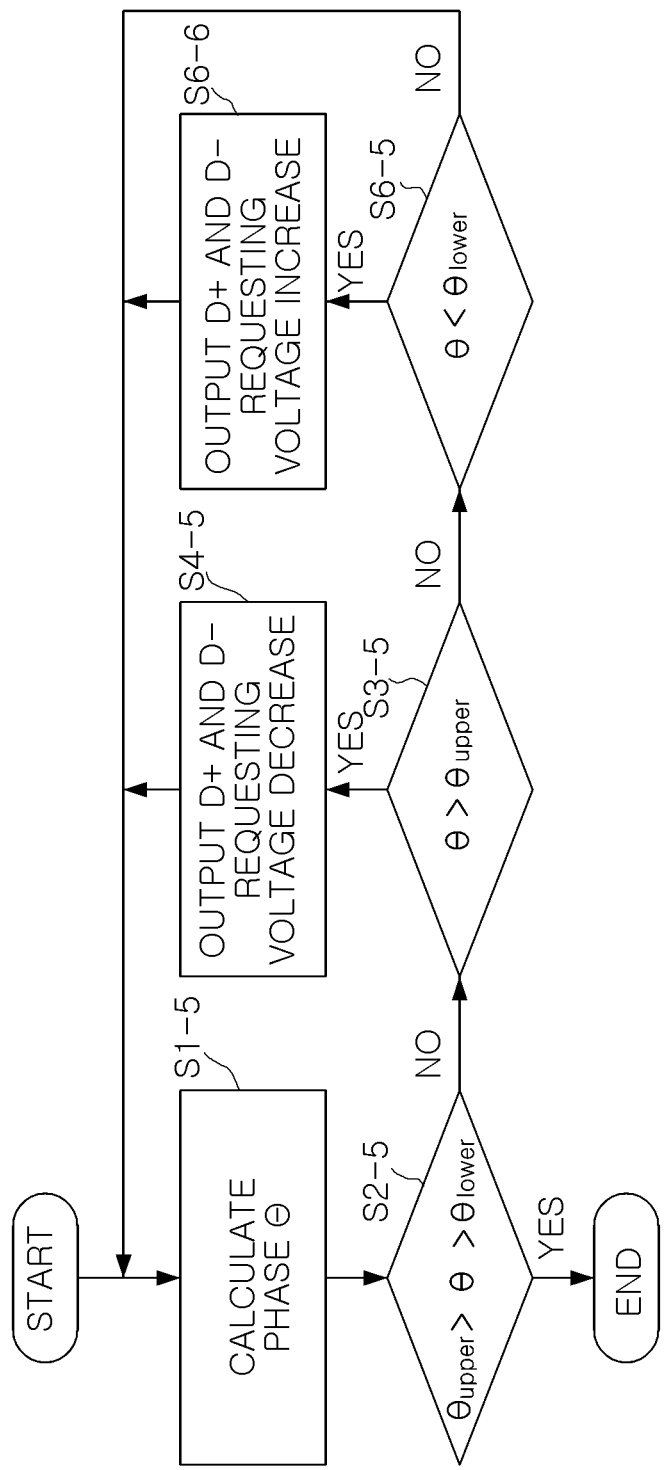
FIG. 14 is a flowchart illustrating a control operation according to a phase of the non-contact type power transfer apparatus according to an embodiment.

FIG. 14 is a flowchart illustrating a control operation according to a phase of the non-contact type power transfer apparatus according to one or more embodiments.

The controller controls the power conversion operation of the power converter by the phase modulation scheme, and a power conversion phase of the power converter is calculated as described in FIG. 7A.

Referring to FIG. 14, if the phase θ, calculated as described above, is within the reference range ($θ_{lower} < θ < θ_{upper}$), the controller maintains the power level of the input power, and if the phase θ is out of the reference range ($\theta<\theta_{lower}$) or ($\theta>\theta_{upper}$), the controller makes a request of a variation of the power level of the input power transferred from the variable adaptor.

For example, if the phase θ is higher than the upper phase of the reference range ($\theta>\theta_{upper}$) the controller provides the input power control signal requesting that the voltage level of the input power transferred from the variable adaptor is decreased to the variable adaptor.

Further, for example, if the phase θ is lower than the lower phase of the reference range ($\theta<\theta_{lower}$) the controller provides the input power control signal requesting that the voltage level of the input power transferred from the variable adaptor is increased to the variable adaptor.

For example, the controller requests the variable adaptor to vary the voltage level of the input power by varying the voltage level of the input power control signal.

Similarly, in a case in which the voltage gain of the non-contact type power transfer apparatus should be increased or decreased, such as the load being changed, the voltage level of the transmission power being increased or decreased, or combinations thereof, since the power converter varies the voltage gain within the reference range including the substantially optimal operation point by varying the voltage level of the input power from the power supply, there is an advantage in that efficiency is improved across a broad range of the load conditions.

However, it may be difficult to apply the phase modulation scheme described above to the half-bridge inverters S1 and S2 of the power converter 820 of the non-contact type power transfer apparatus 800 according to the eighth embodiment illustrated in FIG. 11.

As described above, according to one or more embodiments, the wireless power transmission operation is performed within the substantially optimal operation range by varying the level of the input power on the basis of the control signal controlling the power converter, whereby power conversion efficiency is substantially improved, and a load greater than the related art is able to be output.

The apparatuses, units, modules, devices, controllers and other components illustrated in FIGS. 1-4 and 8-11 that perform the operations described herein with respect to FIGS. 5B, 6B, 7B, and 12-14 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 5B, 6B, 7B, and 12-14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5B, 6B, 7B, and 12-14 that perform the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after gaining a thorough understanding of the present disclosure, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As set forth above, according to the embodiments, the power conversion efficiency is improved, and/or the power level greater than the related art is able to output.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A non-contact type power transfer apparatus comprising:
    a power converter configured to convert input power into transmission power;
    a power transmitter configured to transmit the transmission power in a non-contact manner; and
    a controller configured to provide a power conversion control signal to control a power conversion operation of the power converter according to a state of the transmission power, and to output an input power control signal to control a power level of the input power according to the power conversion control signal,
    wherein the input power control signal is set based on the power conversion control signal.

2. The non-contact type power transfer apparatus of claim 1, further comprising a power supply configured to adjust the power level of the input power according to the input power control signal output from the controller and to supply the input power to the power converter.

3. The non-contact type power transfer apparatus of claim 2, wherein the controller is further configured to output the power conversion control signal to adjust at least one of a switching frequency of the power converter, a switching on/off duty ratio of the power converter, or combinations thereof; and,
    to output the input power control signal to adjust a switching on/off duty ratio of the power supply according to at least one of the switching frequency of the power converter, the switching on/off duty ratio of the power converter, or combinations thereof.

4. The non-contact type power transfer apparatus of claim 3, wherein the controller is further configured to calculate at least one of the switching frequency of the power converter, the switching on/off duty ratio of the power converter according to the power conversion control signal and a clock signal, or combinations thereof, and to output the input power control signal, adjusting the switching on/off duty ratio of the power supply depending on whether a result of the calculation is outside of a reference range.

5. The non-contact type power transfer apparatus of claim 2, wherein the controller is further configured to output the power conversion control signal to comprise a first gate signal and a second gate signal, and to calculate switch on phases of the first gate signal and the second gate signal according to the power conversion control signal and a clock signal, and to output the input power control signal to adjust the switching on/off duty ratio of the power supply depending on whether a result of the calculation is outside of a reference range.

6. The non-contact type power transfer apparatus of claim 2, wherein the controller is further configured to employ the power conversion control signal as the input power control signal.

7. The non-contact type power transfer apparatus of claim 1, wherein the controller is further configured to transmit the input power control signal to an external variable adaptor supplying the input power to the power converter.

8. The non-contact type power transfer apparatus of claim 1, wherein the power converter comprises a full-bridge inverter or a half-bridge inverter.

9. A non-contact type power transfer apparatus comprising:
    a power converter configured to convert input power into transmission power;
    a power transmitter configured to transmit the transmission power in a non-contact type manner; and
    a controller configured to adjust a power level of the input power in response to a state of a power conversion operation of the power converter being outside of a reference range,
    wherein the controller is further configured to control the power conversion operation by providing a power conversion control signal to the power converter, and
    wherein the controller is further configured to adjust the power level of the input power by providing an input power control signal set based on the power conversion control signal.

10. The non-contact type power transfer apparatus of claim 9, further comprising a power supply configured to adjust the power level of the input power according to a control of the controller and to supply the varied power level of the input power to the power converter.

11. The non-contact type power transfer apparatus of claim 10, wherein the controller is further configured to adjust the power level of the input power in response to the state of the power conversion operation, the state of the power conversion operation comprising at least one of a switching frequency of the power converter, a switching on/off duty ratio of the power converter, or combinations thereof.

12. The non-contact type power transfer apparatus of claim 9, wherein the controller is further configured to adjust the power level of the input power depending on whether at either one or both of the switching frequency of the power converter and the switching on/off duty ratio of the power converter is outside of the reference range.

13. The non-contact type power transfer apparatus of claim 9, wherein
    the power converter control signal comprises a first gate signal and a second gate signal, and
    the controller is further configured to adjust the power level of the input power depending on whether switch on phases of the first gate signal and the second gate signal are outside of the reference range.

14. The non-contact type power transfer apparatus of claim 9, wherein the controller is further configured to transmit the input power control signal to an external variable adaptor supplying the input power to the power converter.

15. The non-contact type power transfer apparatus of claim 9, wherein the power converter comprises a full-bridge inverter or a half-bridge inverter.

16. A wireless power transfer apparatus, comprising:
a power supply configured to provide a variable power responsive to a supply signal;
a power converter coupled to the power supply, the power converter being configured to convert the variable power into a transmission power; and,
a controller configured to adaptively adjust the variable power of the power supply and one or more operational characteristics of the power converter, in response to a calculation performed on the transmission power,
wherein the controller is configured to adaptively adjust the one or more operational characteristics of the power converter by providing a converter control signal to the power converter, and
wherein the controller is configured to adaptively adjust the variable power of the power supply by setting the supply signal based on the converter control signal.

17. The wireless power transfer apparatus of claim 16, wherein the controller comprises a processor configured to continuously calculate a switching frequency of the power converter relative to a reference clock; and, to adaptively adjust a duty ratio of the power converter in response to the calculated switching frequency to maintain the switching frequency within a predetermined range.

18. The wireless power transfer apparatus of claim 16, wherein:
the power converter comprises a switch, and
the controller comprises a processor configured to
generate the converter control signal for the switch,
continuously calculate a duty ratio of the converter control signal output to the power converter, and
adaptively adjust the duty ratio of the converter control signal in response to the calculated duty ratio.

19. The wireless power transfer apparatus of claim 16, wherein:
the power converter comprises two switches, and
the controller comprises a processor configured to
generate two control signals, of the converter control signal, respectively corresponding to the two switches for control of the two switches,
continuously calculate a phase difference between the two control signals, and
adaptively adjust a duty ratio of the switches in response to the calculated phase difference.

* * * * *